J. H. SKELTON.
NUT LOCK.
APPLICATION FILED NOV. 14, 1910.
999,529.
Patented Aug. 1, 1911.
3 SHEETS—SHEET 1.
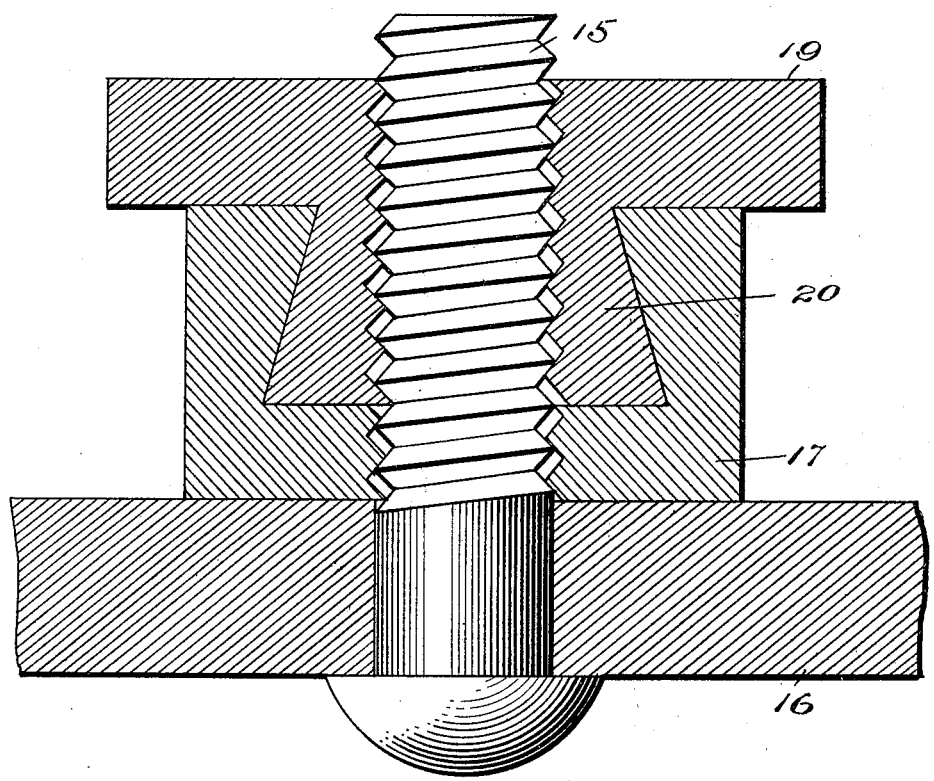
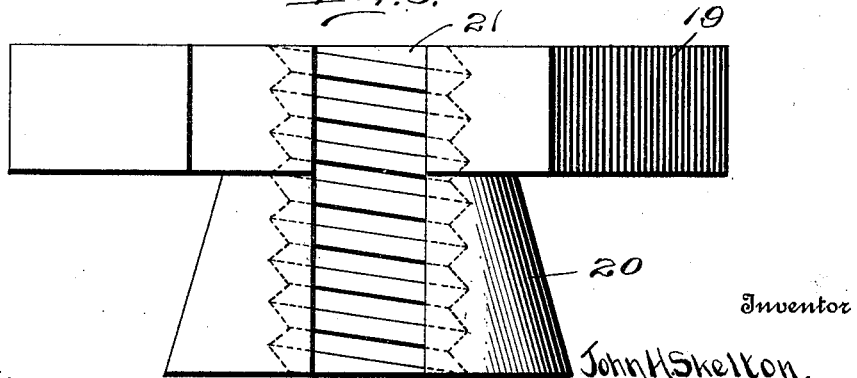

J. H. SKELTON.
NUT LOCK.
APPLICATION FILED NOV. 14, 1910.
999,529.
Patented Aug. 1, 1911.
3 SHEETS—SHEET 2.
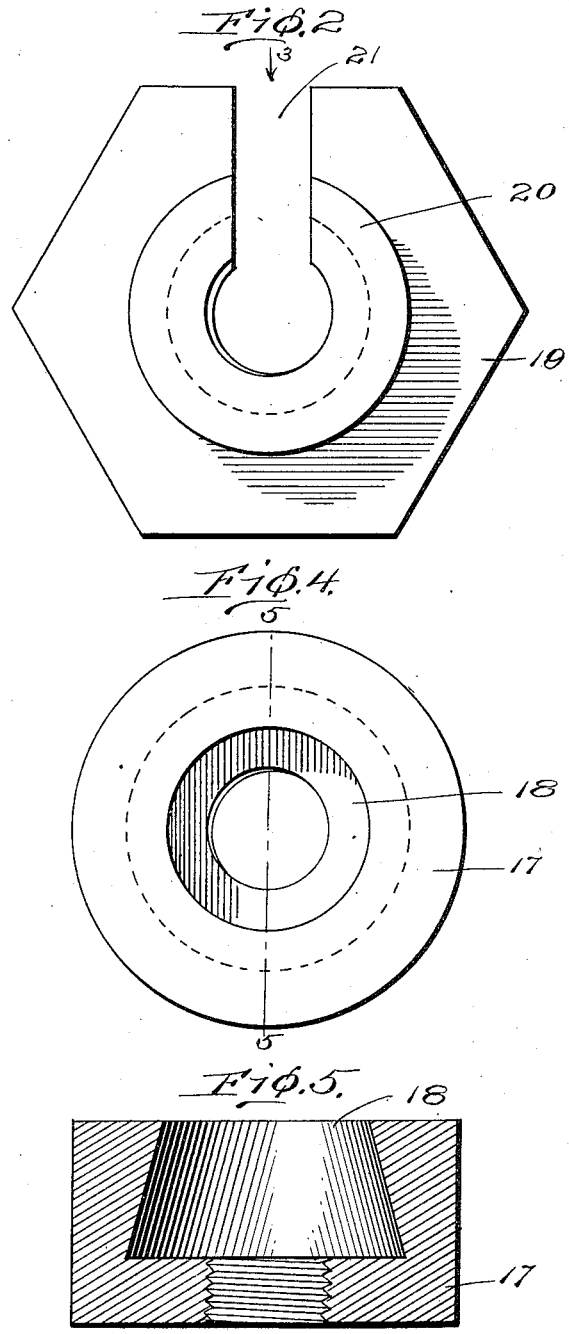

J. H. SKELTON.
NUT LOCK.
APPLICATION FILED NOV. 14, 1910.
999,529.
Patented Aug. 1, 1911.
3 SHEETS—SHEET 3.
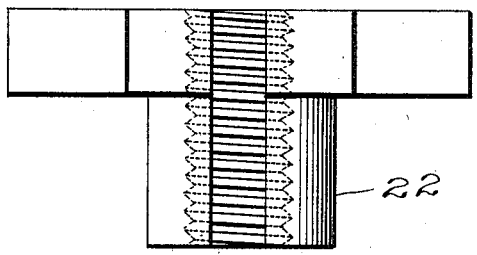
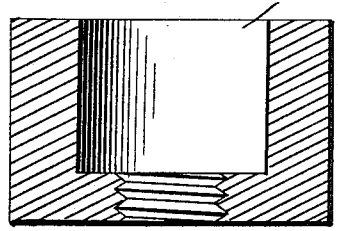
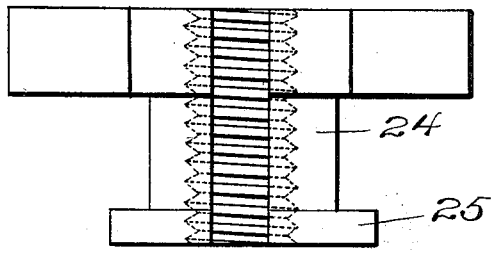
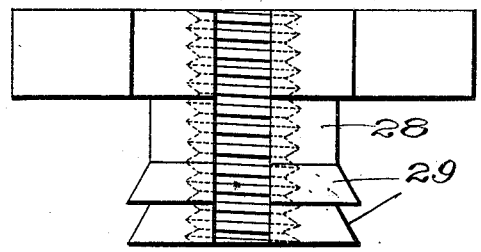
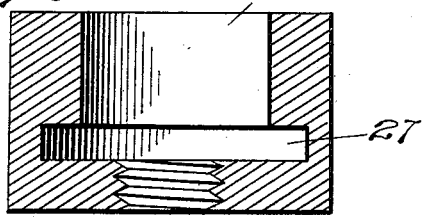
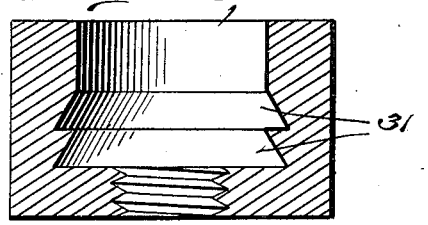
Witnesses
Inventor
John H. Skelton,
By Mason Fenwick & Lawrence
E. J. Fenwick Attorneys
COLUMBIA PLANOGRAPH CO., WASHINGTON, D. C.

UNITED STATES PATENT OFFICE.

JOHN H. SKELTON, OF BAYONNE, NEW JERSEY.

NUT-LOCK.

999,529. Specification of Letters Patent. Patented Aug. 1, 1911.

Application filed November 14, 1910. Serial No. 592,329.

*To all whom it may concern:*

Be it known that I, JOHN H. SKELTON, a citizen of the United States, residing at Bayonne, in the county of Hudson and State of New Jersey, have invented certain new and useful Improvements in Nut-Locks; and I do hereby declare the following to be a full, clear, and exact description of the invention, such as will enable others skilled in the art to which it appertains to make and use the same.

This invention relates to nut locks and has for an object to provide a combination of a nut and connected threaded washer normally inseparable and so arranged that the stress of the threads of the nut and threaded washer are applied to different sides of the threads of the bolt.

A further object of the invention is to provide a combined nut and threaded washer, the nut being rotatable within the threaded washer and fitted within the socket formed in such washer and so arranged that the tightening of the nut upon the bolt expands such nut into rigid engagement with the threaded washer.

A further object of the invention is to provide a threaded washer having a socket formed therein with a threaded opening concentric with the socket and a nut engaged within the socket and provided with a thread similar to the thread of the washer, the threaded openings of both the nut and the washer being of such dimensions as to fit loosely upon the bolt.

With these and other objects in view the invention comprises certain novel constructions, combinations and arrangement of parts as will be hereinafter more fully described and claimed.

In the drawings: Figure 1, is a transverse sectional view of the device on a greatly enlarged scale to illustrate the action of the nut and threaded washer relative to the inclination of the threads of the bolt. Fig. 2, is an inverted plan view of the nut. Fig. 3, is a view in side elevation of the nut as indicated by arrow 3 in Fig. 2 and on the scale of Fig. 1. Fig. 4, is a top plan view of the threaded washer. Fig. 5, is a diametrical sectional view of the threaded washer disassociated from the nut. Fig. 6, is a view in side elevation of a modified form of nut. Fig. 7, is a view in diametrical section of a modified form of washer adapted for association with the nut as shown at Fig. 6. Fig. 8, is a view in side elevation of still a different embodiment of the nut. Fig. 9, is a view in diametrical section of a modified form of threaded washer adapted for association with nut shown at Fig. 8. Fig. 10, is a view in side elevation of still a different modification of the nut. Fig. 11, is a view in diametrical section of a modification of the threaded washer adapted for interaction with the nut shown at Fig. 10.

Like characters of reference designate corresponding parts throughout the several views.

The improved nut lock consisting of the nut proper and the threaded washer is adapted for use in connection with a bolt, as 15, of any usual and ordinary construction shown at Fig. 1, associated with a plate 16 or other article upon which the nut lock is used. A threaded washer 17 is provided having a socket 18 formed therein, preferably frusto-conical, with the larger end of such frustum within the threaded washer and a nut 19 is also provided having a shank 20 also frusto-conical and shaped and proportioned to fit within the socket 18 of the threaded washer with a dove-tailed effect.

To permit the insertion of the shank 20 within the socket 18 and also to permit expansion of the nut the nut 19 is slitted longitudinally, as at 21, entirely through the side of such nut. For inserting the nut within the threaded washer the shank 20 may be closed to such an extent that the larger end will pass through the open end of the threaded washer and the nut then expand by any usual and ordinary mechanical means.

It is desirable that the nut rotate freely within the threaded washer and be greater in diameter than the threaded washer so that a wrench may be applied to the nut to rotate such nut without rotating the threaded washer. On the other hand it is desirable that the nut fit the threaded washer sufficiently close so that the threaded washer will screw upon the bolt freely in conjunction with the nut until it engages the fish plate or object to which it is applied. As soon as it encounters such obstructions the threaded washer ceases to rotate while the nut continues to rotate. The action is to force the threaded washer firmly downwardly upon the plate to bear against the upper inclination of the threads of the bolt while the nut bearing against the under inclination of such threads is expanded by the continued wedging action so that the shank 20 is expanded into and grips firmly the inner walls of the socket 18. By this arrangement the nut and threaded washer when associated as shown at Fig. 1 become in reality a nut having a thread of different pitch from the thread of the bolt which prevents the loosening of the nut and combined threaded washer. The action relative to the combining of the nut and threaded washer is the same as exemplified in copending applications Nos. 560,937, filed May 12th, 1910 and 565,269, filed June 6th, 1910, the difference being in the construction of the nuts and washers.

Instead of constructing the socket and shank as illustrated at Figs. 1 to 5 inclusive a reasonably satisfactory arrangement is shown at Figs. 6 and 7 wherein the shank 22 is cylindrical and the socket 23 also cylindrical. As soon as the nut and threaded washer engage upon the bolt, as shown at Fig. 1, the cylindrical portion of the shank 22 is expanded to engage the cylindrical walls of the socket 23 and thereby firmly combine the nut and threaded washer together which until such action have not been inseparably connected.

At Figs. 8 and 9 the shank 24 is provided with an annular flange 25 at its end and the socket 26 provided with an annular groove 27 into which the flange 25 fits. This is for the purpose of preventing separation of the nut and threaded washer the action otherwise being exactly the same.

At Figs. 10 and 11 the shank 28 is provided with a plurality of beveled flanges 29 and the socket 30 similarly provided with a plurality of beveled annular grooves 31. The action of the embodiment shown at Figs. 10 and 11 is the same as that shown at Figs. 1 to 5 inclusive.

I claim:

1. In a nut lock, a threaded washer provided with a socket concentric with the threads, a nut having a shank proportioned to fit within the socket, such nut and shank being threaded concentrically and positioned to register with the threading of the washer and also slitted radially.

2. In a nut lock, a threaded washer having a socket concentric with the threads and larger at the bottom than at the top, a nut having a shank adapted to fit the socket and threaded concentrically, said nut and shank being also slitted radially.

3. A nut lock embodying a threaded washer having a socket concentric with the threads and provided with tapered sides larger at the bottom than at the top, a nut having a shank with tapered sides complementary with the tapered sides of and fitting within the socket, and slitted radially.

In testimony whereof I affix my signature in presence of two witnesses.

JOHN H. SKELTON.

Witnesses:
  ANITA R. HOUGHTON,
  MYRTLE A. REED.

---

Copies of this patent may be obtained for five cents each, by addressing the "Commissioner of Patents, Washington, D. C."